United States Patent [19]

Akazaki et al.

[11] Patent Number: 5,556,657
[45] Date of Patent: Sep. 17, 1996

[54] PROCESS FOR PREPARING SHEET-LIKE SOYBEAN PROTEIN FOODS

[75] Inventors: Kenichi Akazaki, Nishinomiya; Hirokazu Tatsubo, Yao, both of Japan

[73] Assignee: Fuji Oil Company, Limited, Osaka-fu, Japan

[21] Appl. No.: 567,402

[22] Filed: Dec. 5, 1995

Related U.S. Application Data

[63] Continuation-in-part of Ser. No. 391,510, Feb. 21, 1995.

[30] Foreign Application Priority Data

Feb. 22, 1994 [JP] Japan .................................. 6-024263

[51] Int. Cl.$^6$ ........................................................ A23L 1/00
[52] U.S. Cl. ............................................ 426/241; 426/243
[58] Field of Search .................................... 426/241, 243, 426/634

[56] References Cited

FOREIGN PATENT DOCUMENTS 61-128842  6/1986  Japan .

OTHER PUBLICATIONS

Abstract of JP–86–194580, QP Tamago KK et al., "Foods in Sheet–Comprising Damping Agent Mixed with Heat Coagulable Protein and Moulded to Sheet", Jun. 1986.

Abstract of JP–90–243871, Niwano, "Preparation of Film–type Food", Jul. 1990.

Abstract of JP–60–047647, Yukio et al., "Preparation of Instant Noodles", Mar. 1985.

Abstact of 73(07):G0359, Tsuyuki et al., "Up–to–Date Food Processing", 1972.

Abstract of JP–78–64351, Kibun KK, "Dried Bean Curd–Like Food", Aug. 1985.

Abstract of JP–2–171156, Niwano, "Preparation of Expanded Food", Jul. 1990.

Abstract of JP–78–34447, Meiji KK, "Food Similar to Abura–age, Preparation", Mar. 1978.

Abstract of JP–92–062341, Jung Food Co., "Soy Milk Preparation Process", Nov. 1990.

*Primary Examiner*—George Yeung
*Attorney, Agent, or Firm*—Wenderoth, Lind & Ponack

[57] ABSTRACT

A process for preparing sheet-like soybean protein foods which comprises molding a soybean protein raw material mixture into a sheet and irradiating it intermittently by a microwave is disclosed. The sheet-like soybean protein foods obtained have fine porous structures with considerably high strength and flexible and soft mouth feel. The desired taste can be readily given to the sheet-like soybean protein foods by boiling them in a seasoning liquid.

5 Claims, No Drawings

PROCESS FOR PREPARING SHEET-LIKE SOYBEAN PROTEIN FOODS

This application is a continuation-in-part of now abandoned application, Ser. No. 08/391,510, filed Feb. 21, 1995.

FIELD OF THE INVENTION

The present invention relates to a process for preparing sheet-like soybean protein foods, which have fine porous structures and sightly swollen appearances.

BACKGROUND OF THE INVENTION

Many kinds of sheet-like foods made from proteins have been known. They can be classified into non-swollen film type foods such as "yuba (membrane-like Japanese traditional soybean protein food)" and edible films and swollen type foods such as "aburaage (fried soybean curd)".

As for methods of swelling, frying (heating in oil) and microwave heating are known.

Frying is a method wherein heat conducts from the outside to the inside of food materials by heating outside. In fried food materials, not only the oil oozes out of the materials, but also the fried products have cavities therein and swollen appearances.

Microwave heating is a method which heats the inside of materials by an electromagnetic wave. Comparing with frying which heats the outside of the materials, microwave heating is better in that quick inside heating can be obtained. Following microwave heating methods, most of which are used as means for drying, have been known.

For example, JP-B 60-38100 discloses a process for preparing foods having yuba-like structure, which are swollen spongy form by high-frequency heating to form spongy materials. However, there is no disclosure of intermittent irradiation.

JP-A 61-128842 discloses sheet-like foods and microwave heating for heat coagulation drying. However, there is no disclosure of intermittent irradiation.

JP-A 2-171155 discloses a process for preparing membrane-like foods. However, microwave heating is used only for heat-drying and there is no disclosure of intermittent irradiation.

OBJECTS OF THE INVENTION

The present inventors have studied intensively so as to prepare sheet-like soybean protein foods which have slightly swollen appearances and fine porous structures. As a result, it has been found that the desired sheet-like soybean protein foods can be prepared by alternately repeating swelling and shrinking of hydrates or emulsions of soybean proteins (hereinafter referred to as a soybean protein raw material mixture) plural times. Further, it has been found that the final sheet-like soybean protein foods can be prepared by intermittent irradiation of a microwave.

Thus, one object of the present invention is to provide a process for preparing sheet-like soybean protein foods which have slightly swollen appearances and fine porous structures. This object as well as other objects and advantages of the present invention will become apparent to those skilled in the art from the following description.

SUMMARY OF THE INVENTION

According to the present invention, there is provided a process for preparing sheet-like soybean protein foods which comprises molding a soybean protein raw material mixture into a sheet and irradiating it intermittently by a microwave. More specifically, the present invention relates to a process for preparing a sheet-like soybean protein food having a swollen appearance which comprises molding a soybean protein raw material mixture, without the addition of a damping agent, into a sheet of 0.1 to 20 mm in thickness, and irradiating it intermittently by a microwave at least three times to obtain the sheet-like soybean protein food having a water content of 38.5 to 68% by weight and an average pore diameter of 2 to 0.5 mm.

The present invention is different from the above known microwave heating methods in that microwave irradiation is carried out intermittently, and that sheet-shaped soybean protein foods thus obtained have slightly swollen appearances and fine porous structures.

DETAILED DESCRIPTION OF THE INVENTION

The soybean protein raw material mixture used in the present invention is a hydrate or an emulsion of soybean proteins.

Soybean proteins used in the present invention can be obtained by extracting soybeans or defatted soybeans as raw materials with water. Such soybean proteins may be, for example, isolated soybean proteins, condensed soybean proteins, soybean milk powders, or partial hydrolyzates thereof. Particularly, isolated soybean proteins are preferred.

A hydrate of soybean proteins can be used in the form of a paste prepared by adding water to soybean proteins and mixing or kneading the mixture. Normally, the amount of water to be used is 2.5 to 6 parts by weight, preferably 2.8 to 5.5 parts by weight, more preferably 3 to 5 parts by weight per one part by weight of soybean proteins, though it can be varied according to a particular kind of soybean proteins and their gel-forming abilities.

An emulsion of soybean proteins can be prepared by mixing or kneading soybean proteins, water and an oil by a silent cutter or the like. The oil to be used are not specifically limited and any known oil can be used. Examples of the known oils include edible vegetable oils such as soybean oil, safflower oil, rapeseed oil, sesame oil, corn oil and cotton seed oil, palm oil, coconut oil and the like, edible animal oils such as fish oil and the like, fractionated oils thereof and a mixture of these oils.

The ratio of soybean proteins, water and oil can be varied according to a particular kind of soybean proteins and their emulsifying abilities. Normally, 2.5 to 6 parts by weight of water and 0.1 to 2 parts by weight of the oil are suitably used per one part by weight of soybean proteins.

For improving moldability of the soybean protein raw material mixture, casein can be used. In addition, food additives such as coloring agents, flavors, seasonings, salts and the like can be added.

For molding the soybean protein raw material mixture into a sheet, either a batch molding or a continuous extrusion molding can be used. Normally, a continuous extruder is suitable for industrial use.

Suitably, the soybean protein raw material mixture is molded into a sheet of 0.1 to 20 mm, preferably 0.5 to 10 mm, more preferably 1 to 6 mm in thickness. When the sheet is too thick, the sheet tends to be uneven due to uneven swelling. When the sheet is too thin, molding will be difficult.

The width of the sheet is not specifically limited and can be suitably selected according to particular production conditions. The length of the sheet is not specifically limited either and can be suitably selected according to particular production conditions. The sheet may be a continuous sheet as it is continuously molded or the sheet can be cut into a suitable length.

Either a continuous sheet or cut sheet can be continuously irradiated by a microwave. According to a particular purpose, the sheet can be cut into a suitable length after microwave irradiation.

Thus, in one feature of the present invention, the soybean protein raw material mixture thus molded in a shape of a sheet is irradiated by a microwave.

A microwave irradiating device for industrial use can be used in the present invention. Normally, the frequency of the microwave is 2450 MHz.

In another feature of the present invention, the desired sheet-like soybean protein foods are prepared by irradiating a sheet of the soybean protein raw material mixture intermittently by a microwave plural times to repeat swelling and shrinking.

When a swollen tissues similar to "aburaage (fried tofu)" is formed by single microwave irradiation according to a conventional method, swelling is started from the peripheral part of a sheet of the soybean protein raw material mixture molded and then swelling extends toward the center thereof like a rice cake. During this stage, drying at the earlier swollen part is taken place by microwave irradiation and then the dried part is hardened. Even when the resulting material is cooled, the part is shrunk and a sheet having even thickness cannot be obtained. That is, sheet-like soybean protein foods as those of the present invention cannot be obtained because swelling is uneven in appearance due to large differences in swelling among parts of a sheet and the degree of swelling is high and cavities are formed therein.

In the present invention, the energy of the microwave is controlled so that the center of a sheet of the soybean protein raw material mixture does not swollen as a rice cake by a single irradiation. By irradiating repeatedly, the peripheral part of a sheet of the soybean protein raw material mixture is firstly swollen. Then, upon stopping the microwave irradiation, the peripheral part of the sheet shrinks. By the next microwave irradiation, swelling extends gradually from the peripheral part toward the portion around the center of the sheet. Then, upon stopping the microwave irradiation, the swollen part which have extended toward the portion around the center of the sheet shrinks. By the subsequent microwave irradiation, swelling extends from the peripheral part to the center of the sheet. Then, upon stopping the microwave irradiation, shrinking occurs to give a sheet-like soybean protein food which has an almost even thickness. Since the energy of the microwave irradiation is controlled so that a sheet of the soybean protein raw material mixture cannot swell completely by a single irradiation, small swelling and shrinking can be repeated with preventing swelling as a rice cake, which makes the production of the sheet-like soybean protein food having an even thickness possible.

In view of heat history, it is suitable to repeat irradiation at least three times. The energy of the microwave per a single irradiation should be lower than that can swell a sheet of the soybean protein raw material mixture completely, but enough to swell at least a portion (peripheral part) of the sheet. Normally, the temperature of the sheet should be 100° C. or higher for its swelling under the atmospheric pressure.

When the number of the intermittent irradiation times is too small, only the peripheral part of a sheet of the soybean protein raw material mixture swells without swelling of the center part and the sheet becomes half-cooked. If the energy of the microwave is high enough to swell the entire sheet by a single irradiation, as described above, the center of the sheet swells like a rice cake and the surface is dried and hardened. Even when such a sheet is cooled, sufficient shrinking does not occur and cavities form therein, which results in uneven thickness. On the other hand, when the energy is insufficient to swell a peripheral part of a sheet of the soybean protein raw material mixture, swelling of the sheet cannot take place even by irradiation many times.

The intermittent microwave irradiation of the present invention can be carried out by either a batch process or a continuous process.

When a batch process is carried out, a cycle of an irradiation step and an interruption step can be repeated. The periods of the irradiation step and the interruption step can be suitably selected.

In a continuous process, for example, when a tunnel type irradiating device is used, irradiation can be carried out intermittently by providing a microwave irradiating zone and a irradiation interrupting zone alternately.

The sheet-like soybean protein foods thus prepared have slightly swollen appearances, even thickness, and fine porous internal structures.

In general, when swelling is proved by frying in oil or a single irradiation, inner cavities, large swelling and uneven thickness are caused. However, the sheet-like soybean protein foods of the present invention have fine porous internal structures, slight swelling and even thickness.

In the sheet-like soybean protein foods of the present invention, the pore size of the fine porous structure is almost even. The pore size can be smaller, as the irradiation energy of a microwave is lower and the number of irradiation times is larger. Normally, the average pore diameter can be 2 mm to 0.05 mm, preferably 1.5 mm to 0.1 mm, more preferably 1 mm to 0.1 mm.

The thickness of the sheet-like soybean protein foods of the present invention is almost even because fine porous structure forms the inner tissues without minimizing formation of inside cavities by repetition of uniform and small swelling and shrinking using intermittent microwave irradiation. The swelling can be carried out in such a small degree that, for example, in the case that the original thickness of a sheet of the soybean protein raw material mixture is 5 mm, the thickness of the foods obtained should be not more than 1.6 times (8 mm or less), preferably less than 1.4 times (7 mm or less), more preferably 1.3 times (6.5 mm or less) as thick as the original thickness of the sheet. In the case of "aburaage (fried soybean curd)" prepared from a sheet of raw soybean curd of 5 mm in thickness, normally, the sheet is swollen 2 to 3 times (10 to 15 mm) or more. In addition, there is a difference in the degree of swelling between the peripheral and center parts and the thickness is uneven. Although the internal structure of "aburaage" could be said to be a network structure, its opening is large and a cavity structure is present as seen in "sushiage (aburaage used for "sushi")".

The sheet-like soybean protein foods of the present invention have more flexible and softer mouth feel and they have relatively large strength compared with a conventional "aburaage". In addition, when the sheet-like soybean protein foods of the present invention are cooked in a seasoning liquid, the desired taste can be readily given.

By utilizing these properties, the sheet-like soybean protein foods of the present invention can be widely used, for example, for cooked foods, raw materials for instant foods, daily dishes and the like.

The sheet-like soybean protein foods of the present invention can be marketed and stored, for example, in the form of chilled foods, retort foods, canned foods and the like.

The following Examples and Comparative Examples further illustrate the present invention in detail. However, they are not to be construed to limit the scope of the present invention. In the Examples and Comparative Examples, all the parts and percents are by weight unless otherwise stated.

EXAMPLE 1 AND COMPARATIVE EXAMPLE 1

Isolated soybean protein [New Fujipro E (manufactured by Fuji Oil Co., Ltd.), 100 parts], white screwed soybean oil (100 parts), casein (1.2 parts) and water (360 parts) were mixed and kneaded to obtain a soybean protein raw material mixture. The mixture was molded into a sheet having 80 mm of width and 5 mm of thickness by continuous extrusion molding. The sheet thus continuously extruded was cut into respective sheet materials each of which had 80mm of length. The weight of each sheet thus obtained was about 30 g.

Then, the respective sheets of the soybean protein raw material mixture were irradiated by a microwave (frequency was 2450 MHz) as shown in Table 1 using an electronic cooker (Hi-Cooker RE-122 manufactured by Sharp Corp.).

The total irradiation period (irradiation history time) was equally 80 sec. In Example 1, the irradiation was repeated intermittently to swell and shrink the sheet, repeatedly, while the irradiation was carried out once or twice in the Comparative Example 1. The conditions of the irradiation are shown in Table 1. The thickness of the sheet-like soybean protein foods obtained are also shown in Table 1. As for the thickness, the ranges between the minimum thickness and the maximum thickness are also shown in Table 1.

TABLE 1

|  | Comparative Example 1 | | Example 1 | |
| --- | --- | --- | --- | --- |
|  | a | b | No. 1 | No. 2 |
| Irradiation time (sec.) | 80 | 40 | 20 | 10 |
| Interruption time (sec.) | — | 20 | 10 | 10 |
| Number of repetition | ×1 | ×2 | ×4 | ×8 |
| Total irradiation time (sec.) | 80 | 80 | 80 | 80 |
| Thickness (mm) | 8–12 | 7–10 | 5–6 | 5–6 |

Appearance and inner tissue of the sheet-like soybean protein foods obtained under the conditions shown in Table 1 were evaluated.

The product of Comparative Example 1-a was swollen to a large extend in appearance and the maximum swelling was about 2.4 times as thick as the original thickness of the sheet of the soybean protein raw material mixture. The thickness was uneven and the inside was hollow. Its appearance and the inner tissues were similar to those obtained by conventional frying. In addition, the product of Comparative Example 1-a was stiff and not flexible.

The product of Comparative Example 1-b was less swollen than that of Comparative Example 1-a. The maximum thickness was about twice of the original thickness of the sheet and was thinner than that of Comparative Example 1-a. However, the inner tissue was somewhat hollow and the thickness was somewhat uneven.

The product of Example 1-No. 1 was less swollen in appearance than those from Comparative Example 1-a and b, and the maximum swelling was about 1.2 times as thick as the original thickness of the sheet. The thickness was uniform and the swelling in appearance was prevented.

There were fine porous structures inside of the product of Example 1-No. 1, and the pore size was fine and almost uniform (less than about 1.5 mm). The product of Example 1-No. 1 was more flexible than those of Comparative Example 1-a and b.

The appearance of the product from Example 1-No. 2 was almost same as that of Example 1-No. 1. The inner tissue was composed of fine pores (less than about 1 mm). The flexibility was also excellent.

Then, the products obtained in Comparative Example 1 and Example 1 were cut into rectangles and were put into a boiling seasoning liquid having the composition as described below. The liquid was again boiled and then it was cooked gently for 10 minutes. After stopping the heating, the products were taken out. Permeation of the seasoning liquid and mouth feel were estimated.

| Composition of the seasoning liquid | |
| --- | --- |
| Component | Parts |
| Dense soya sauce | 80 |
| "Hon-mirin (brewed sweet seasoning)" | 50 |
| Sugar | 13 |
| Aroma-stock "katsuobushi (flaked dried bonito)" | 14 |
| Aroma-stock "kombu (sea tangle)" | 3 |
| Water | 840 |

Results of the estimation

The seasoning liquid did not permeate uniformly into the sheet-like soybean protein foods obtained in Comparative Example 1-a. Its mouth feel was still hard.

In the product of Comparative Example 1-b, although the seasoning liquid relatively permeated, the permeation was insufficient and mouth feel was still hard.

The seasoning liquid permeated into the product of Example 1-No. 1 more sufficiently and uniformly than the products of Comparative Example 1-a and b. The taste of the product from Example 1-No. 1 was better and the mouth feel was less hard and more flexible than the products of Comparative Example 1-a and b.

The seasoning liquid permeated the product of Example 1-No. 2 much more sufficiently and uniformly than the product from Example 1-No. 1. The taste of the product of Example 1-No. 2 was much more excellent and the mouth feel was similar to, or somewhat more flexible and softer than the product of Example 1-No. 1.

EXAMPLE 2 AND COMPARATIVE EXAMPLE 2

Although the total irradiation period was constant in Example 1, in this example, each single irradiation period was constant, while the number of irradiation times was varied to change the irradiation history.

The raw materials, the preparation of a sheet of the soybean protein raw material mixture, the size of the molded sheet and its weight, and the microwave irradiating device same as those in Example 1.

The irradiation was carried out by repeating a cycle of an irradiation step for 10 minutes to swell the sheet and then an interruption step for 10 min to shrink the sheet.

The results are shown in Table 2. The thickness of the sheet-like soybean protein foods obtained are also shown in Table 2.

TABLE 2

|  | Comparative Example 2 | | | Example | | | |
| --- | --- | --- | --- | --- | --- | --- | --- |
|  | c | d | e | No. 3 | No. 4 | No. 5 | No. 6 |
| Irradiation time (sec.) | 10 | 10 | 10 | 10 | 10 | 10 | 10 |
| Number of irradiation | ×1 | ×2 | ×4 | ×6 | ×8 | ×10 | ×12 |
| Irradiation history (sec.) | 10 | 20 | 40 | 60 | 80 | 100 | 120 |
| Thickness (mm) | 5 | 5 | 5 | 5–6 | 5–6 | 5–6 | 6–7 |

Very small swellings were found in appearance of the products of Comparative Example 2-c, d and e and Example 2-No. 3, No. 4 and No. 5 after the microwave irradiation. Although the product of Comparative Example 2-No. 6 swelled to some extent, the difference of swelling was quite small. This was resulted from the longer heat history due to the long total irradiation time rather than the larger number of irradiation.

The insides of products of Comparative Example 2-c, d and e were half-cooked and porous internal structures were not formed sufficiently because of the insufficient heat history. On the other hand,, fine porous structures (fine opening tissues of less than about 1 mm) were formed in the products of Example 2-No. 3 and No. 4. Because of the long total irradiation time and the long heat history, sizes of inner porous structures of the products of Example 2-No. 5 and No. 6 tended to become somewhat larger. However, the pore size was small (less than about 1.5 mm).

According to the same manner as in Example 1, the permeation of the seasoning liquid was estimated.

The seasoning liquid permeated the products of Comparative Example 2-c,d and e insufficiently. Their tastes were not good and their mouth feel was half-cooked, fragile and not flexible at all.

The seasoning liquid permeated the products of Example 2-No. 3, No. 4, No. 5 and No. 6 sufficiently and uniformly. Their tastes were excellent, and their mouth feel was flexible and soft.

Water contents of the sheet-like soybean protein foods used were 68.0% (c), 66.2% (d), 64.0% (e), 60.4% (No. 3), 55.0% (No. 4), 48.1% (No. 5) and 38.0% (No. 7). The foods obtained from the present invention had suitable water contents and gave flexible and soft mouth feel.

As described hereinabove, according to the present invention, sheet-like soybean protein foods having fine porous structures therein can be obtained. The sheet-like soybean protein foods were considerably strong, having flexible and soft mouth feel. When the sheet-like soybean protein foods are boiled in a seasoning liquid, the tastes of the seasonings readily permeate them.

What is claimed is:

1. A process for preparing a sheet-like soybean protein food having a swollen appearance which comprises molding a soybean protein raw material mixture, without addition of any damping agent, into a sheet of 0.1 to 20 mm in thickness, and irradiating it intermittently by a microwave at least three times to obtain the sheet-like soybean protein food having a water content of 38.5 to 68% by weight and an average pore diameter of 2 to 0.5 mm.

2. A process according to claim 1, wherein the soybean protein raw material mixture is a hydrate of soybean proteins and contains 2.5 to 6 parts by weight of water per one part by weight of soybean proteins.

3. A process according to claim 1, wherein the soybean protein raw material mixture is an emulsion of soybean proteins and contains 2.5 to 6 parts by weight of water and 0.1 to 2 parts by weight of oil per one part by weight of soybean proteins.

4. A process according to claim 1, wherein the molding is carried out by extrusion molding.

5. A process according to claim 1, wherein the microwave irradiation is carried out in such a manner that the energy of the microwave per a single irradiation should be lower than that can swell a sheet of the soybean protein raw material mixture completely, but enough to swell at least a peripheral part of the sheet.

* * * * *